US006938721B2

(12) United States Patent
Ono et al.

(10) Patent No.: US 6,938,721 B2
(45) Date of Patent: Sep. 6, 2005

(54) STEERING APPARATUS AND METHOD FOR AUTOMOTIVE VEHICLE

(75) Inventors: Hitoshi Ono, Kanagawa (JP); Kazuo Hara, Kanagawa (JP); Kiyotaka Shitamitsu, Kanagawa (JP); Takaaki Eguchi, Yokohama (JP); Yuusuke Katou, Kanagawa (JP); Toshiaki Kasahara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/853,644

(22) Filed: May 26, 2004

(65) Prior Publication Data

US 2004/0238258 A1 Dec. 2, 2004

(30) Foreign Application Priority Data

May 29, 2003 (JP) ...................................... 2003-153083

(51) Int. Cl.[7] .............................. B62D 5/00; B62D 5/04

(52) U.S. Cl. ....................... 180/402; 180/444; 180/446; 701/43

(58) Field of Search ................................ 180/402, 407, 180/406, 403, 405, 446, 444; 74/388 PS; 701/43

(56) References Cited

U.S. PATENT DOCUMENTS

| | | | | |
|---|---|---|---|---|
| 6,138,788 A | | 10/2000 | Bohner et al. | |
| 6,279,675 B1 | | 8/2001 | Bohner et al. | |
| 6,442,462 B1 | | 8/2002 | Nishizaki et al. | |
| 6,580,989 B1 | * | 6/2003 | Husain et al. | 701/41 |
| 6,705,424 B2 | * | 3/2004 | Ogawa et al. | 180/446 |
| 6,814,177 B2 | * | 11/2004 | Bohner et al. | 180/402 |
| 2003/0141134 A1 | * | 7/2003 | Sherwin et al. | 180/402 |
| 2004/0262072 A1 | | 12/2004 | Hara et al. | |

FOREIGN PATENT DOCUMENTS

| | | |
|---|---|---|
| DE | 197 55 044 C1 | 3/1999 |
| DE | 199 26 534 A1 | 12/2000 |
| EP | 0 522 924 A1 | 1/1993 |
| EP | 0 983 926 A2 | 3/2000 |
| EP | 1 205 371 A2 | 5/2002 |
| JP | 2001-301639 A | 10/2001 |
| JP | 2002-145098 A | 5/2002 |

OTHER PUBLICATIONS

U.S. Appl. No. 10/853,780, filed May 26, 2004, Hara et al.

* cited by examiner

*Primary Examiner*—Tony Winner
(74) *Attorney, Agent, or Firm*—Foley & Lardner LLP

(57) ABSTRACT

In steering apparatus and method for an automotive vehicle, a turning section that turns steered road wheels is provided, a clutch is installed in a predetermined position in a midway through a steering system from an operation input section to the steered road wheels to link between the operation input section and the steered road wheels, a steering angle of the operation portion is detected, a turning angle is detected, an elastically deformable member is interposed between the operation portion and the turning portion to transmit a steering torque inputted from the operation input section to the steered road wheels when the clutch causes the operation input portion and the steered road wheels to be connected; and an angular deviation between the steering angle detection value and the turning angle detection value developed due to a deformation of the member is calculated.

15 Claims, 4 Drawing Sheets

STEERING APPARATUS AND METHOD FOR AUTOMOTIVE VEHICLE

BACKGROUND OF THE INVENTION

1. Field of the Invention

The present invention relates to a technique of, so-called, steer-by-wire type steering apparatus and method for an automotive vehicle in which a clutch to link an steering input section to steered road wheels which are mechanically separated is interposed in a midway through a steering system from the steering input section to the steered road wheels.

2. Description of the Related Art

A Japanese Patent Application First Publication No. 2002-145098 published on May 22, 2002 (which corresponds to a U.S. Pat. No. 6,442,462 issued on Apr. 27, 2002) exemplifies a previously proposed steering system of the steer-by-wire type. In the previously proposed steering system disclosed in the above-described Japanese Patent Application First Publication, a torque sensor is interposed between a steering wheel and a reaction motor. In a case where part of a system fails, the clutch is connected so that a steering force with a vehicle driver directly turns (steers) tire (or road) wheels and a torque assistance control (power steering) by means of a controllable motor according to a signal of the torque sensor.

SUMMARY OF THE INVENTION

However, it is necessary to install the torque sensor between the steering wheel and the reaction motor which is not needed in a normal steer-by-wire control, in the previously proposed steering apparatus. Hence, a manufacturing cost is accordingly increased due to the presence of the torque sensor.

It is, therefore, an object of the present invention to provide steering apparatus and method for an automotive vehicle which are capable of providing an optimum assistance torque during the connection of the clutch, according to an estimation of the steering torque using an steering angle sensor and a turning angle sensor which are already installed in a system although the system is a low cost effectiveness and a space saving without installation of the torque sensor installed in proximity to the steering input section.

According to one aspect of the present invention, there is provided a steering apparatus for an automotive vehicle, comprising: an operation portion having an operation input section; a turning section that turns steered road wheels; a clutch installed in a predetermined position in a midway through a steering system from the operation input section to the steered road wheels to link between the operation input section and the steered road wheels; a steering angle detecting section installed in the operation portion to detect a steering angle of the operation portion; a turning angle detecting section installed in the turning section that detects a turning angle; an elastically deformable member interposed between the operation portion and the turning portion that transmits a steering torque inputted from the operation input section to the steered road wheels when the clutch causes the operation input section and the steered road wheels to be connected; and an angular deviation calculating section that calculates an angular deviation between the steering angle detection value and the turning angle detection value developed due to the deformation of the elastically deformable member.

According to another aspect of the present invention, there is provided a steering method for an automotive vehicle, comprising: providing an operation portion having an operation input section; providing a turning section that turns steered road wheels; providing a clutch installed in a predetermined position in a midway through a steering system from the operation input section to the steered road wheels to link between the operation input section and the steered road wheels; detecting a steering angle of the operation portion; detecting a turning angle; providing an elastically deformable member interposed between the operation portion and the turning section that transmits a steering torque inputted from the operation input section to the steered road wheels when the clutch causes the operation input section and the steered road wheels to be connected; and calculating an angular deviation between the steering angle detection value and the turning angle detection value developed due to the deformation of the elastically deformable member.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

(First Embodiment)

Figure 1:
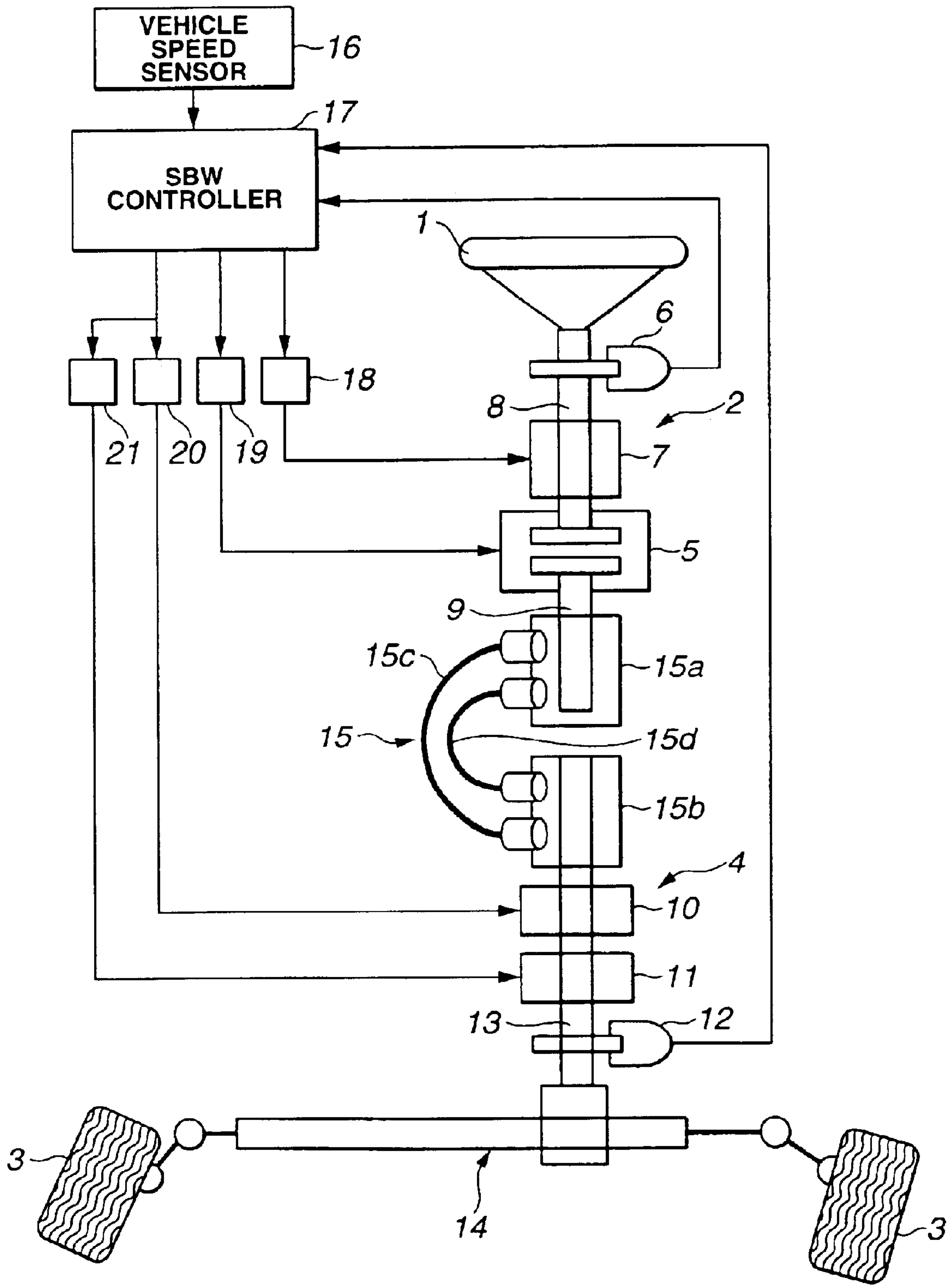
FIG. 1 is a whole configuration view of a steering apparatus in a first preferred embodiment according to the present invention.

FIG. 1 shows a whole system configuration view of a vehicular steering apparatus in a preferred embodiment according to the present invention. In the first embodiment, a tuning actuator of a steer-by-wire system (hereinafter also referred to as a SBW system) is a duplex system for a fail safe purpose is exemplified.

In FIG. 1, a steering wheel (a steering input section) 1 is installed within a vehicular passenger compartment (not shown). A reference numeral 2 denotes an operation portion. A reference numeral 3 denotes steered road wheels and a reference numeral 4 denotes a turning section. A reference numeral 5 denotes a clutch. A reference numeral 6 denotes a steering angle sensor. A reference numeral 7 denotes a reaction force actuator. A reference numeral 8 denotes steering angle sensor. A reference numeral9 denotes a second column shaft (steering axle). A reference numeral 10 denotes a fist turning (angle) actuator. A reference numeral 11 denotes a second turning (angle) actuator and a reference numeral 12 denotes a pinion angle sensor (turning angle sensor). A reference numeral 13 denotes a pinion shaft (turning angle axle). A reference numeral 14 denotes a steering mechanism. A reference numeral 15 denotes a cable mechanism. A reference numeral 16 denotes a vehicle speed sensor. A reference numeral 17 denotes a steer-by-wire controller. A reference numeral 18 denotes a reaction force actuator drive circuit and a reference numeral 19 denotes a clutch drive circuit. A reference numeral 20 denotes a first turning actuator drive circuit. A reference numeral 21 denotes a second turning actuator drive circuit.

The steering apparatus in the first embodiment includes: operation portion 2 having steering wheel 1; turning section 4 to turn the steered road wheels 3 and 3; and clutch 5 linking steering wheel 1 to steered wheels 3 and 3 which are mechanically separated. First column shaft 8 of operation part 2 is provided with steering wheel 1, steering angle sensor 6, and reaction force actuator 7. Clutch 5 is constituted by an electromagnetic clutch which can control a connection and release from an external and is interposed between first column shaft 8 and second column shaft 9 of operational portion 2.

Pinion shaft 13 of turning section 4 is provided with first turning actuator 10, second turning actuator 11, and pinion angle sensor 12. On the bottom end of pinion shaft 13, a steering mechanism 14 of a rack-and-pinion type is linked. Steered road wheels (non-driven wheels) 3 and 3 are interposed between both sides of steering mechanism 14 whose turning angles can be varied in accordance with a movement of a rack gear axle.

Cable mechanism 15 includes: two cables **15*c* and 15*d* extended between operational portion 2 and turning portion 4 which are examples of low-rigidity members (which can extend (an elastic deformation is possible) due to a steering torque transmitted during a time at which clutch 5 is connected; a first cable reel 15*a* disposed on a lower end of second column shaft 9; and a second cable reel 15*b* disposed on an upper end of pinion shaft 13. Two cables 15*c* and 15*d* serve to link both cable reels 15*a* and 15*b*** when they are respectively wound on the respective cable reels mutually in opposite directions.

Steer-by-wire (SBW) controller 17 (or SBW controller) receives various sensor signals from steering angle sensor 6, pinion angle sensor 12, and vehicle speed sensor 16, and controls reaction force actuator 7, clutch 5 installed on operation portion 2, first turning actuator 10 and second turning actuator 11 disposed on turning section 4, these actuators 7, 10, 11, and clutch 5.

Steer-by-wire controller 17 is provided with a fail safe control section that outputs a command to connect clutch 5 when a failure occurs in SBW system and outputs a command to obtain an assistance torque in accordance with an angle deviation between the calculated steering angle and turning angle to at least one of two turning actuators 10 and 11 (namely, a normal actuator).

Next, an action of the first embodiment of the steering apparatus will be described below.

[Steer-by-Wire Control Process]

Figure 2:
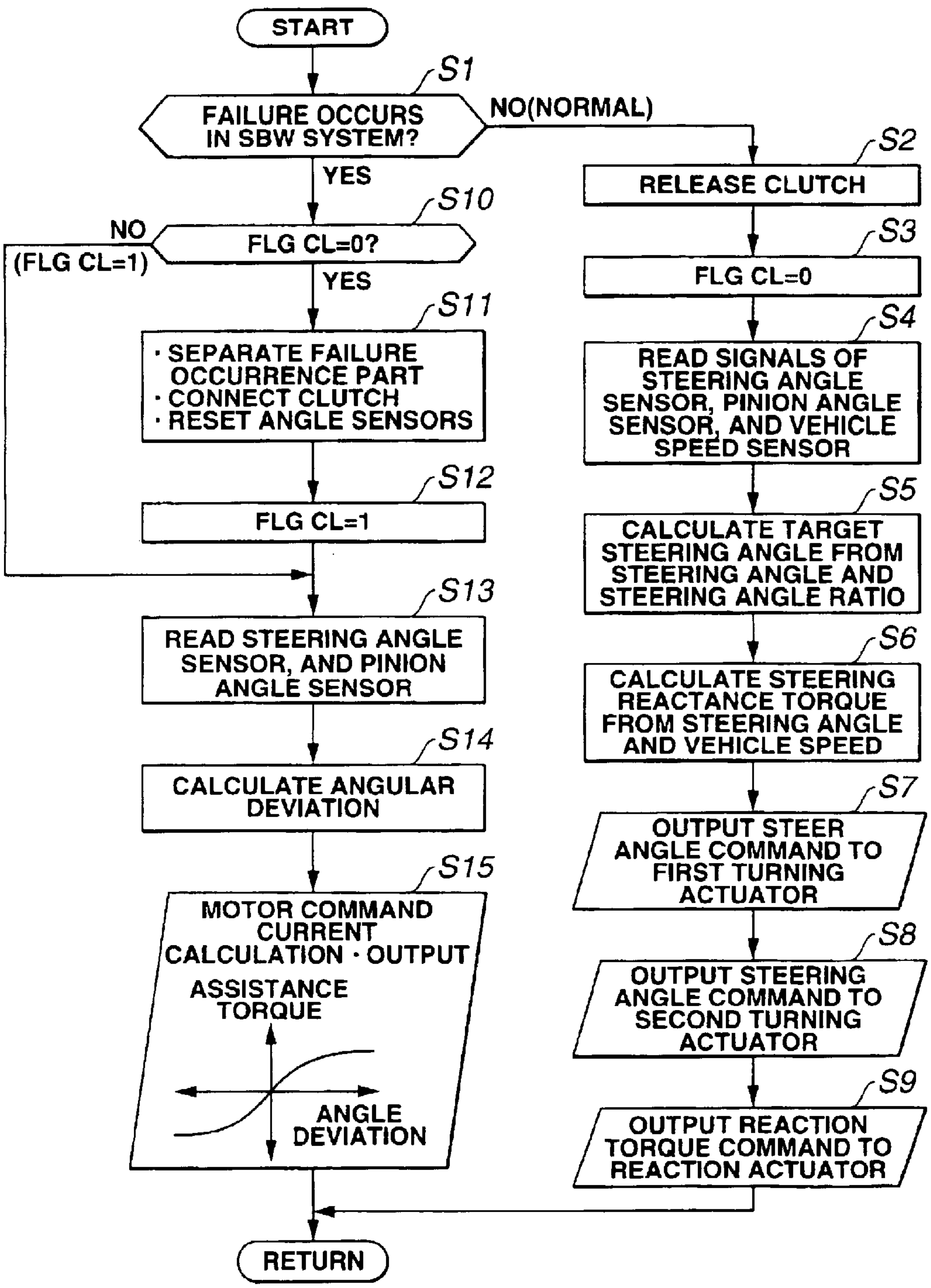
FIG. 2 is an operational flowchart representing a steer-by-wire control process executed by a steer-by-wire controller (SBW controller) shown in FIG. 1.

FIG. 2 shows an operational flowchart executed by means of steer-by-wire controller 17 in the first embodiment and representing a steer-by-wire control procedure.

At a step S1, SBW controller 17 determines whether SBW system has failed according to diagnosis analysis of respective drive circuits 18, 19, 20, and 21. If No (Normal), the routine goes to a step S2. If Yes (Failure), the routine goes to a step S10. At step S2, SBW controller 17 maintains the release of clutch 5 released or releases connected clutch 5 and the routine goes to a step S3. At step S3, SWB controller 17 resets a clutch flag FLG CL to zero representing that clutch 5 is released and the routine goes to a step S4. At step S4, SWB controller 17 reads sensor signals from steering angle sensor 6, pinion angle sensor 12, vehicle speed sensor 16 and the routine goes to a step S5.

At step S5, SWB controller 17 calculates a steering (angle) ratio (a ratio between the steering angle and the turning angle) by means of a map or calculation in accordance with the steering angle and turning angle to calculate a target turning angle and the routine goes to a step S6.

At step S6, SBW controller 17 calculates an optimum target steering reaction torque in accordance with the steering situation and vehicular state from the steering angle and vehicle speed and the routine goes to a step S7. At step S7, SWB controller 17 outputs a command to coincide an actual turning angle with the target turning angle to first turning actuator 10 and the routine goes to a step S8.

At step S8, SBW controller 17 outputs a command to obtain the target turning angle and the routine goes to a step S9. Then, two turning actuators 10 and 11 cause the angular control for the steering system using the two turning actuators. Hence, the current value to obtain the required torque needed to turn steered road wheels 3 and 3 is distributed to two turning actuators 10 and 11. For example, the current value corresponds to the torque which is half of that required to turn the vehicle per turning actuator.

At a step S9, SBW controller 17 outputs the command to obtain the steering reaction torque calculated at step S8 for reaction force actuator 7 and, then, the routine returns to RETURN.

At step S10, when the SBW system is determined to be failed at step S1, SWB controller 17 determines whether flag FLG CL is reset to "0". If Yes at step S10, the routine goes to a step S11. If No at step S10, the routine goes to a step S13. At step S13, SBW controller 17 reads steering angle sensor 6 and pinion angle sensor 12 and the routine goes to a step S14. At step S14, SWB controller 17 calculates an angular deviation between the turning angle detection value based on the pinion angle sensor signal and the steering angle detection value based on the steering angle sensor signal and the routine goes to a step S15 (constituting angular deviation calculating section)

At a step S15, SBW controller 17 calculates a motor command current using an assistance torque map described in brackets within step S15 and outputs this motor command current to at least one of first and second turning actuators 10 and 11 and is returned to RETURN. If the motor command currents are supplied to both of first and second turning actuators 10 and 11, it is possible to perform the actuators in the same manner as the normal operation time. In a case where either of the turning actuators 10 and 11 is outputted, a torque required to turn steered road wheels 3 and 3 by means of one of the turn actuators is obtained. It is noted that an assistance torque map is set in such a way that, in a small angular deviation region, as the angular deviation becomes large, the assistance torque is proportionally increased and as the angular deviation further becomes large, a gradient of increase in the assistance torque becomes small. It is noted that, as the assistance torque map may be such a map that, as the angular deviation and vehicle speed are varied, the assistance torque may be varied or may be such a map that the assistance torque is varied in accordance with the angular deviation and other vehicle drive states.

[SBW System Normal Time]

When SBW system is normally operated, the flowchart of FIG. 2 indicates such a flow as step S1→step S2→step S3→step S4→step S5→step S6→step S7→step S8→step S9.

That is to say, a release control such as a clutch 5 installed within operational portion 2 (step S2), an angular control for first turning actuator 10 and for second turning actuator 11 installed on turning section 4 (steps S7 and S8), and a steering reaction force control (step S9) against reaction actuator 7 installed within operational portion 2 are carried out.

Hence, steered road wheels 3 and 3 can be turned according to an optimum steering ratio in accordance with manipulated variable (steering angular displacement) and manipulation speed (or a steering angular velocity) for steering wheel 1 of the vehicle driver during the steering operation, with exhibition of the advantage of steer-by-wire type in which steering wheel 1 is mechanically separated from steered road wheels 3 and 3. In the steering apparatus in which steering wheel 1 and steered road wheels 3 and 3 are mechanically linked, a steering reaction (force) is given to the vehicle driver due to a turning resistance developed between a road surface and each of steered road wheels. On the contrary, in the steer-by-wire (SBW) system in which steering wheel 1 is mechanically separated from steered road wheels 3 and 3, a steering reaction (force) is not transmitted to the steering wheel but a sense of incompatibility in the steering operation is given to the driver. However, in this embodiment of the steering apparatus, the steering reaction force in the same way as the steering apparatus linked mechanically is given to the driver via steering wheel 1 by means of reaction force actuator 7.

[Failure in SBW System]

When a first control activation during a SBW system failure, in the flowchart shown in FIG. 2, such a series of flows as step S1→step S10→step S13→step S14→step S15 repeatedly occurs. At step S13, the sensor signals of steering angle sensor 6 and pinion angle sensor 12 are read. At step S14, the angular deviation between the detected values of the steering angle and turning angle is calculated. At step S15, motor command current is calculated using the angular deviation and the assistance torque map and is outputted to one of both of first and second turning actuators 10 and 11 which is normal in operation.

Even when the SBW system fails, unless steering angle sensor 6, pinion angle sensor 12, and at least one of both of turning actuators 10 and 11 which is normal are normally operated, using an estimated information of the steering torque referring to the angular deviation, an appropriate assistance torque which relieves a steering burden on the driver can be given.

[Assistance Torque Providing Action During the SBW System Failure]

According to Japanese Patent Application First Publication No. 2002-145098 (corresponding to U.S. Pat. No. 6,442,462), in the SBW system, a plurality of turning actuators and reaction (force) actuator fail, steering wheel and steering mechanism are mechanically connected by means of a clutch mechanism. Thereafter, such a torque sensor as disposed in the vicinity to the steering wheel detects the steering torque of the vehicle driver. From among the turning actuators and reaction actuator, using the actuator which can normally be controlled, the reactance torque in accordance with the steering torque is given to relieve the driver's burden.

However, actually, it is very difficult to install the torque sensor in the vicinity to the torque sensor placed in the vicinity to the steering wheel, a low rigidity member such as a cable mechanism is disposed on a route in a steering torque transmission system which is mechanically linked to the steering wheel due to the connection of the clutch. The reason is that the angular deviation occurs between operation portion 2 and turning section 4 in accordance with the steering torque and this angular deviation can be detected using steering angle sensor 6 and pinion angle sensor 12 which are essential in SBW system. The steering torque can be estimated from the detected angular deviation and member's rigidity. In accordance with the estimated steering torque, for example, in the case of the first embodiment, by controlling one of two turning actuators 10 and 11 which is normally operated, the assistance torque can be provided.

Next, advantages of the steering apparatus in the first embodiment will be explained below.

(1) In the vehicular steering apparatus in which clutch 5 interposed in a midway through a intermediate position of the steering system from steering wheel 1 to steered road wheels 3 and 3 and clutch 5 linking steering wheel 1 to steered wheels 3 and 3, steering angle sensor 6 installed on operation portion 2 to detect the steering angle, pinion angle sensor 12 to detect the turning angle, and a member which transmits the steering torque inputted from steering wheel 1 to steered road wheels 3 and 3 when clutch 5 is linked between steering wheel 1 and steered road wheels 3 and 3 and elastically deforms according to the steering torque, and angular deviation calculating section (step S1) which calculates an angular deviation between the detected values of the steering angle and the turning angle. Hence, the system having the low cost and space saving provided without installation of the torque sensor can be achieved. In addition, since the steering torque is estimated using the normally available steering angle sensor 6 and pinion angle sensor **12*d*, a simple assistance torque can be provided with clutch 4** connected.

(2) The above-described member is two cable members, the two cable members are first cable reel **15*a* installed within operational portion 2 and second cable reel 15*b* installed in turning section 4 to link operational portion 2 to turning section 4 with the two cable members wound on the first and second reels mutually in the opposite direction. Hence, during the failure by the SWB system with clutch 5 connected, the rigidity which can provide a compatibility between the deformation quantity that can the angular deviation by means of the steering angle sensor 4 and pinion angle sensor 12** and a stable feeling of the steering operation can easily be obtained.

(3) The SBW system is constituted by reaction actuator and clutch 5 installed within operation portion 2, first turning actuator 10 and second turning actuator 11 installed within turning portion 4, and steer-by-wire controller 17 controls these actuators 7, 10, and 11, and clutch 5. Steer-by-wire controller 17, when SBW system fails, outputs the command to connect clutch 5 and outputs the command to obtain the assistance torque in accordance with the angular deviation between the steering angle and the turning angle calculated by angular deviation calculating step S14 and outputs the command to obtain the assistance torque in accordance with the angular deviation between the steering angle and the turning angle calculated at step S14 to at least one of two turning actuators 10 and 11 which is determined to be normal. Hence, during the failure of the SBW system, unless steering angle sensor 6 and pinion angle sensor 12 are normally operated and at least one of both of turning actuators 10 and 11 which is normally operated, the steering torque estimation information is used to provide an appropriate assistance torque for relieving the burden on the steering operation by the driver.

(Second Embodiment)

Figure 3:
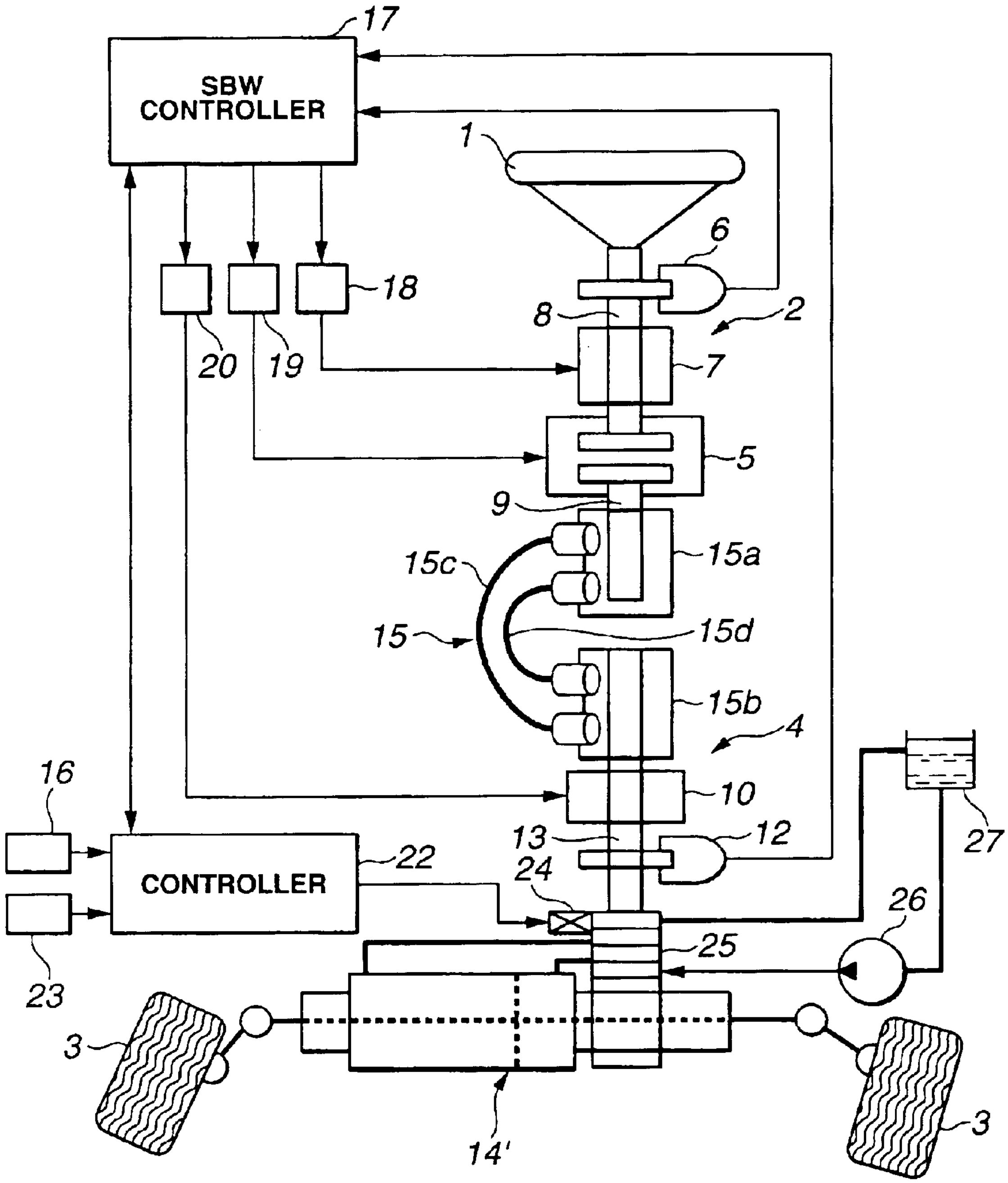
FIG. 3 is a whole configuration view of the steering apparatus in a second preferred embodiment according to the present invention.

A second preferred embodiment of the steering apparatus is an example of a combination of SWB system (reaction force actuator+turning actuator) with a hydraulic power steering system (hereinafter, referred to as a hydraulic PS system). The structure of the second embodiment will be described with reference to FIG. 3. In FIG. 3, reference numeral 1 denotes steering wheel (operation input section), reference numeral 2 denotes operation portion, reference numeral 3 denotes each steered road wheel, reference numeral 4 denotes turning section, reference numeral 5 denotes a clutch, reference numeral 6 denotes steering angle sensor 9, reference numeral 7 denotes reaction force actuator, reference numeral 8 denotes first column shaft (steering axle), reference numeral 9 denotes second column shaft (steering axle), reference numeral 10 denotes a turning actuator, reference numeral 12 denotes a pinion angle sensor (turning angle sensor), reference numeral 13 denotes pinion shaft (turning axle), reference numeral denotes pinion shaft (turning axle), a reference numeral 14' denotes a hydraulic power steering mechanism (hydraulic assistance mechanism), a reference numeral 15 denotes a cable mechanism, a reference numeral 16 denotes a vehicle speed sensor, a reference numeral 17 denotes a steer-by-wire controller, a reference numeral 18 denotes a reaction force actuator drive circuit, a reference numeral 19 denotes a clutch drive circuit, a reference numeral 20 denotes a turning actuator drive circuit, a reference numeral 22 denotes a hydraulic power steering controller, a reference numeral 23 denotes an engine speed sensor, a reference numeral 24 denotes a solenoid valve, a reference numeral 25 denotes a rotary valve, a reference numeral 26 denotes a power steering pump (oil pump), and a reference numeral 27 denotes a reservoir tank.

In the second embodiment, a vehicle speed responsive electronically controlled hydraulic pressure power steering system is combined with the SBW system in which a single turning actuator 10 is provided. In the normal operation, the hydraulic power steering (PS) system provides an assistance torque for the angular control by means of turning actuator 10.

SBW controller 17 inputs sensor signals from steering angle sensor 6 and pinion angle sensor 12, vehicle speed information from hydraulic pressure power steering controller 22 and failure information of the hydraulic pressure power steering system therefrom and controls reaction force actuator 7 and clutch 5 installed on operation portion 2, and controls turning actuator 10 installed on turning section 4.

The hydraulic pressure power steering system includes a hydraulic pressure power steering mechanism 14' disposed on turning section 4, a rotary valve 25 which controls a hydraulic pressure to hydraulic power steering mechanism 14', a power steering pump 26 and reservoir tank 27 which are hydraulic power supply for rotary valve 25, a hydraulic pressure power steering controller 22 inputting the sensor signals from vehicle speed sensor 16 and engine revolution per minute (engine speed) sensor 23, and a solenoid valve 24 whose valve opening degree is controlled in an unlimited stage in accordance with the command issued from hydraulic pressure steering controller 22. Steering-by-wire controller 17 includes the failsafe control portion which outputs the command to connect clutch 5 on the basis of the system failure in the SBW system. With clutch 5 connected, when the hydraulic PS system fails, outputs the command to obtain the assistance torque in accordance with the angular deviation between the calculated steering angle and turning angle to turning actuator 10. The other structure is the same as the first embodiment. Like reference numeral designates the corresponding elements and the same explanation will be omitted herein.

Next, an action of the second preferred embodiment of the steering apparatus will be described below.

[Steer-by-Wire Control Process]

Figure 4:
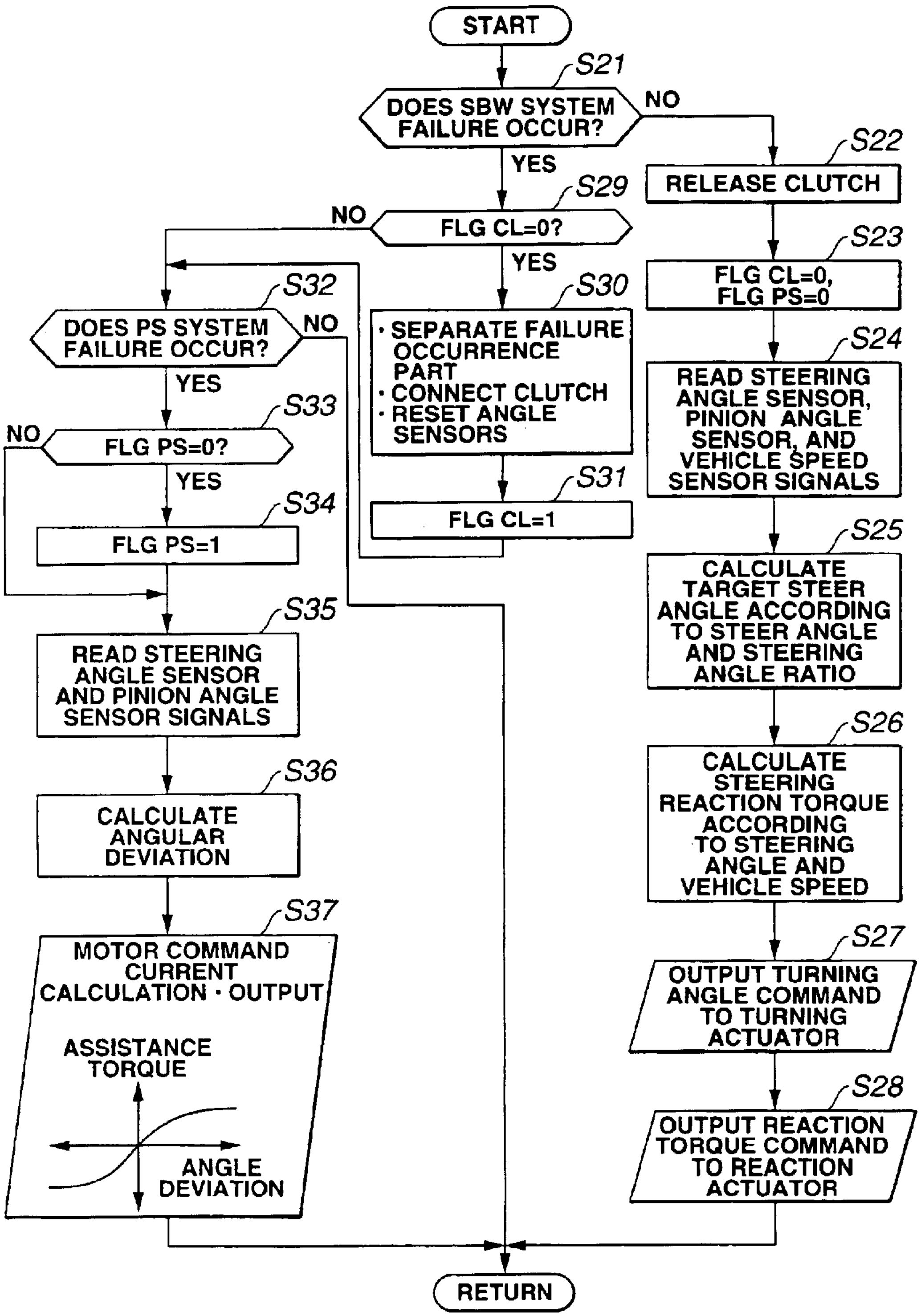
FIG. 4 is an operational flowchart representing a steer-by-wire control process executed by the steer-by-wire controller shown in FIG. 3.

FIG. 4 shows an flowchart for representing a flow of the steer-by-wire control process. That is to say, at a step S21, SBW controller 17 determines whether a failure occurs in SBW system occurs according to a result of diagnosis for, for example, each drive circuit 18, 19, and 20. If No at step S21, the routine goes to a step S22. If Yes (failure) at step S21, the routine goes to a step S29.

At step S22, SBW controller 17 maintains the release of clutch 5 released or releases clutch 5 connected and the routine goes to a step S23. At step S23, SBW controller 17 resets clutch flag FLG CL indicating the connection or release to zero and determines the normality or abnormality in the hydraulic pressure power steering system. If normal, SBW controller 17 resets PS system flag FLG PS indicating the normality or failure to zero (FLG PS=0 indicating that PS system is normally operated) and the routine goes to a step S24. At a step S24, SBW controller 17 reads sensor signals from steering angle sensor 6, pinion angle sensor 12, and vehicle speed sensor 16. Then, the routine goes to a step S25.

At a step S25, SBW controller 17 calculates a target turning angle according to the steering angle, a steering ratio (a ratio between the steering angle and turning angle) determined according to the steering angle through a map and calculation and the routine goes to a step S26.

At step S26, SBW controller 17 calculates target steering reaction torque which is optimum in accordance with the steering situation and the vehicle state and the routine goes to a step S27.

At step S27, SBW controller 17 outputs the command to make an actual turning angle coincident with a target turning angle for turning actuator 10 and the routine goes to a step S28. At step S28, SBW controller 17 outputs the command to obtain target steering reaction force torque calculated at a step S26 and the routine goes to RETURN. At step S29, SBW controller 17 determines whether clutch flag FLG CL is turned to "0" when the failure occurs in the SBW system at a step S21. If Yes (FLG CL=0), the routine goes to a step S30. If No (FLG CL=1) at step S29, the routine goes to a step S32. At a step S30, control of the failure occurrence portion is suspended. Furthermore, clutch drive circuit 19 is operated so as to connect clutch 5 and, at the same time, pinion angle sensor 12 is reset to the same value and the routine goes to a step S31. At step S31, clutch flag FLG CL is set to FLG CL=1 (representing that clutch 5 is connected) and the routine goes to a step S32.

At step S32, SBW controller 17 determines whether the failure occurs in hydraulic PS system on the basis of the failure information from hydraulic pressure power steering controller 22. If Yes (hydraulic pressure PS system failure), the routine goes to a step S33. If No (hydraulic pressure PS system normal), the routine goes to RETURN.

At step S33, when SBW controller 17 determines that the failure occurs in the hydraulic PS system at step S32, SBW controller 17 determines whether PS system flag FLG PS is reset to zero (FLG PS=0). If YES (FLG PS=0), the routine goes to a step S34. If No (FLG PS=1), the routine goes to a step S35. At step S34, SBW controller 17 sets PS system flag FLG PS to "1" (FLG PS=1) to indicate that the hydraulic PS system has failed and the routine goes to a step S36. At step S35, SBW controller 17 reads the sensor signals of steering angle sensor 6 and pinion angle sensor 12 and the routine goes to a step S36.

At step S36, SBW controller 17 calculates the angular deviation between the steering angle detection value based on the steering angle sensor signal and pinion angle sensor signal and the routine goes to a step S37 (this step constitutes an angular deviation calculating section (means)). At step S37, SBW controller 17 calculates the motor command current using the angular deviation calculated at step S36 and using the assistance torque map described in the brackets within step S7, outputs this motor command current to turning actuator 10 and the routine goes to RETURN.

[Normal Time of SBW System]

If the SBW system is operated normally, in the flowchart shown in FIG. 4, such a flow as step S21→step S22→step S23→step S24→step S25→step S26→step S27→step S28 is executed. That is to say, the release control for clutch 5 installed on an operation portion 2 (step S22), angular control for turning actuator 10 on which the turning portion 4 is disposed (step S27), and the steering reaction force control with respect to a reaction force actuator installed on operation portion 2 (step S28) are carried out.

Hence, with the step-by-wire method in which steering wheel 1 and steered wheels 3 and 3 are mechanically linked, during the steering operation, steered road wheels 3 and 3 can be turned in accordance with an optimum steering angle ratio according to the operating variable and operation speed with respect to steering wheel 1 of driver. At this time, the assistance torque is provided for the hydraulic PS system. Furthermore, steering reaction force in the same way as the steering system mechanically linked is provided for the driver via a steering wheel 1 in accordance with reaction force actuator 7.

[SBW System Failure and Normal Operation During Hydraulic Power Steering System]

If SBW system has failed and the hydraulic PS system is operated, during the initial control activation, the flowchart of FIG. 4 exhibits the flow of step S21→step S29→step S30→step S31→step S32→ and returned to RETURN. At step S31, clutch flag FLG GL is rewritten from FLG CL=0 to clutch flag FLG CL=1.

In the next control braking, in the flowchart of FIG. 4, the flow of flowchart shown in FIG. 4 is repeated from step S21→step S29→step S32→ and RETURN. With clutch 5 connected, an angular control to turning actuator 10 and the steering reaction force control to reaction force actuator 7 is suspended.

Hence, in the same way as in the case of the steering apparatus in which steering portion 2 and turning portion 4 are mechanically linked, an operation force of the driver for steering wheel 1 causes steered road wheels 3 and 3 to be turned so that, during this steering operation, the steering reaction force is given from steered wheels 3 and 3. At this time, unless hydraulic power steering system is normal, the hydraulic PS system is normal, using the hydraulic PS system, an appropriate assistance torque which relieves the burden of the driver's steering can be provided. It is noted that the SBW system is a system constituting only turning actuator 10, the hydraulic power steering system has a high reliability against the hydraulic power steering system, and it is not necessary to duplex system for turning actuators.

[Failures in Both SBW System and Hydraulic Power Steering System]

While SBW system and hydraulic PS system have failed, during an initial control activation, in the flowchart shown in FIG. 4, step S21→step S29→step S30→step S31→step S32→step S33→step S34→step S34→step S35→step S36→step S37 are advanced. AT step S31, SBW controller 17 rewrites from SBW system flag FLG CL=0 to FLG CL=1. At a step S34, PS system flag FLG PS 0 is rewritten to FLG PS=1.

Then, in the next control activation, in the flowchart shown in FIG. 4, such a flow as step S21→step S29→step S32→step S33→step S35→step S36→step S37 RETURN occurs That is to say, at step S35, SBW controller 17 reads sensor signal of steering angle sensor 6 and pinion angle sensor 12. At step S36, SBW controller 17 calculates the angular deviation between the steering angle detection value and turning angle detection value. At step S37, SBW controller 17 calculates a motor command current using angular deviation and assistance torque map so that the motor command current is calculated and is outputted to turning actuator 10. Hence, even if the SBW system fails and hydraulic power supply system have failed, steering angle sensor 6, pinion angle sensor 12, and turning actuator 10 are normal, the angular deviation, namely, the estimated information of the steering torque is used so that the appropriate assistance torque to relieve the steering burden for the driver.

Next, the advantage of the vehicular steering apparatus in the second embodiment will be described below. In addition, the following advantages can be given in addition to the advantages (1) and (2) recited in the first embodiment.

(4) The SBW system is constituted by reaction actuator 7; clutch 5 disposed within operational portion 2; a turning actuator 10 installed on turning portion 4; and a steer-by-wire controller 17 which control these actuators 7 and 10 and clutch 5 and the hydraulic pressure PS system is constituted by a hydraulic power steering mechanism 14' disposed on turning section 2; a rotary valve 25 which controls the hydraulic pressure to hydraulic pressure power steering mechanism 14'; and a power steering pump 26 which is a hydraulic power source for rotary valve 25. Hence, SBW controller 17 outputs a command to connect clutch 5 on the basis of a failure occurrence of SBW system. If the failure occurs in the hydraulic PS system with clutch 5 connected, at step S36, the command to obtain assistance torque the angular deviation in accordance with the steering angle and the turning angle is outputted to turning actuator 10. Hence, even during the hydraulic pressure PS system failure and during the failure of hydraulic pressure, unless steering angle sensor 6, pinion angle sensor 12, and turning actuator 10 are normal, the estimation information on the steering torque is used so that the appropriate steering torque which relieves the steering burden of the driver can be provided.

In addition, since the assistance torque is shared with hydraulic pressure PS system during the normal operation state, an output of the assistance torque can be smaller than that in the case of the first embodiment. Furthermore, since the assistance torque is provided by means of hydraulic pressure PS system only by connecting clutch 5 during the failure occurrence of only SBW system. Hence, a necessity of the duplex system for the turning actuators as in the first embodiment is reduced. The number of the turning actuators can be reduced.

As described hereinbefore, the steering apparatus and method for the automotive vehicle have been described with reference to the first and second embodiments. Specific structures are not limited to these embodiments. Various changed and modifications may be made without departing from the scope and sprit of the present invention. For example, in each of the first and second embodiments, the cable is exemplified as the low-rigidity member which is elastically deformed. However, a torsion bar or rubber coupling may be used for the low-rigidity member which is twisted by means of the steering torque since these members are members having the low rigidity and which are elastically deformed due to the steering torque transmitted during the connection of the clutch. It is noted that the term of turning angle means an acute angle formed between the direction of each of the steered road wheels and a vehicular body longitudinal direction and the term of turning actuator may be a turning angle forming actuator.

The entire contents of a Japanese Patent Application No. 2003-153083 (filed in Japan on May 29, 2003) are herein incorporated by reference. The scope of the invention is defined with reference to the following claims.

What is claimed is:

1. A steering apparatus for an automotive vehicle, comprising:

an operation portion having an operation input section;

a turning section that turns steered road wheels;

a clutch installed in a predetermined position in a midway through a steering system from the operation input section to the steered road wheels to link between the operation input section and the steered road wheels;

a steering angle detecting section installed in the operation portion to detect a steering angle of the operation portion;

a turning angle detecting section installed in the turning section that detects a turning angle;

an elastically deformable member interposed between the operation portion and the turning portion that transmits a steering torque inputted from the operation input section to the steered road wheels when the clutch causes the operation input section and the steered road wheels to be connected; and an angular deviation calculating section that calculates an angular deviation between the steering angle detection value and the turning angle detection value developed due to the deformation of the elastically deformable member.

2. A steering apparatus for an automotive vehicle as claimed in claim 1, wherein the member comprises two cable members, the two cable members linking the operation portion and turning section and being wound on a first cable reel disposed on the operation portion and on a second cable reel disposed on the turning section in mutually opposite directions.

3. A steering apparatus for an automotive vehicle as claimed in claim 1, wherein the steering apparatus comprises a steer-by-wire system including: a reaction actuator installed on the operation portion; first turning and second turning actuators; and a steer-by-wire controller that controls the actuators and the clutch, the steer-by-wire controller outputting a command to connect the clutch when a failure occurs in the steer-by-wire system and outputting a command to obtain an assistance torque in accordance with the angular deviation between the steering angle and the turning angle calculated by the angular deviation calculating section to at least one of the two turning actuators.

4. A steering apparatus for an automotive vehicle as claimed in claim 1, wherein the steering apparatus comprises a steer-by-wire system including: a reaction force actuator installed on the operation portion; a turning actuator installed on the turning section; and a steer-by-wire controller that controls the actuators and the clutch and comprises a hydraulic pressure power steering system including a hydraulic pressure power steering mechanism installed on the turning section, a valve that controls a hydraulic pressure to hydraulic pressure power steering mechanism; and an oil pump that is a hydraulic pressure supply source to the valve, the steer-by-wire controller outputting a command to connect the clutch on the basis of a failure occurrence of the steer-by-wire system and outputting a command to obtain the assistance torque in accordance with the angular deviation between the steering angle and turning angle calculated by the angular deviation calculating section to the turning actuator when a failure in the hydraulic pressure power steering system occurs with the clutch connected.

5. A steering apparatus for an automotive vehicle as claimed in claim 3, wherein the steer-by-wire controller comprises: a failure determining section that determines whether the steer-by-wire system has failed; and a clutch connection determining section that determines whether the clutch has been connected or released when the failure determining section determines that the steer-by-wire system has failed.

6. A steering apparatus for an automotive vehicle as claimed in claim 5, wherein the steer-by-wire controller connects the clutch when the clutch connection determining section determines that the clutch has been released and outputs the command to obtain the assistance torque in accordance with the angular deviation between the steering angle and the turning angle to one of the two turning actuators which is determined to be normal.

7. A steering apparatus for an automotive vehicle as claimed in claim 6, wherein a magnitude of the assistance torque is set in such a manner that, as the angular deviation becomes large, the assistance torque is increased and, as the angular deviation becomes large, an increase gradient of the assistance torque becomes small.

8. A steering apparatus for an automotive vehicle as claimed in claim 6, wherein the steer-by-wire controller releases the clutch when the failure determining section determines that the steer-by-wire system has not failed.

9. A steering apparatus for an automotive vehicle as claimed in claim 7, wherein the steer-by-wire controller comprises a target turning angle calculating section that calculates a target turning angle of the steered road wheels according to the detected steering angle and a steering angle ratio when the clutch has been released and a steering reaction torque calculating section that calculates a steering reaction torque in accordance with the detected steering angle and a vehicle speed when the clutch has been released.

10. A steering apparatus for an automotive vehicle as claimed in claim 5, wherein the steer-by-wire controller comprises a steering torque estimating section that estimates a steering torque on the basis of the calculated angular deviation and outputs the command to obtain the assistance torque from the estimated steering torque to both of the two turning actuators when the failure determining section determines that the steer-by-wire system has failed.

11. A steering apparatus for an automotive vehicle as claimed in claim 4, wherein the steer-by-wire controller comprises: a failure determining section that determines whether the steer-by-wire system has failed; a clutch connection determining section that determines whether the clutch has been connected or released when the failure determining section determines that the steer-by-wire system has failed; and a hydraulic pressure power steering system failure determining section that determines whether the hydraulic pressure power steering system has failed when the clutch connection determining section determines that the clutch has been connected.

12. A steering apparatus for an automotive vehicle as claimed in claim 11, wherein the steer-by-wire controller comprises a steering torque estimating section that estimates a steering torque on the basis of the calculated angular deviation and outputs the command to obtain the assistance torque from the estimated steering torque to the turning actuator when the hydraulic pressure power steering system failure determining section determines that the hydraulic pressure power steering system has failed.

13. A steering apparatus for an automotive vehicle as claimed in claim 1, wherein the operation input section comprises a steering wheel.

14. A steering apparatus for an automotive vehicle, comprising:

operation means having operation input means;

turning means for turning steered road wheels;

clutch means installed in a predetermined position in a midway through a steering system from the operation input section to the steered road wheels to link between the operation input means and the steered road wheels;

steering angle detecting means installed in the operation portion for detecting a steering angle of the operation means;

turning angle detecting means installed in the turning means for detecting a turning angle;

an elastically deformable member interposed between the operation means and the turning means for transmitting a steering torque inputted from the operation input means to the steered road wheels when the clutch means causes the operation input means and the steered road wheels to be connected; and angular deviation calculating means for calculating an angular deviation between the steering angle detection value and the turning angle detection value developed due to the deformation of the elastically deformable member.

15. A steering method for an automotive vehicle, comprising:

providing an operation portion having an operation input section;

providing a turning section that turns steered road wheels;

providing a clutch installed in a predetermined position in a midway through a steering system from the operation input section to the steered road wheels to link between the operation input section and the steered road wheels;

detecting a steering angle of the operation portion;

detecting a turning angle;

providing an elastically deformable member interposed between the operation portion and the turning section that transmits a steering torque inputted from the operation input section to the steered road wheels when the clutch causes the operation input section and the steered road wheels to be connected; and calculating an angular deviation between the steering angle detection value and the turning angle detection value developed due to the deformation of the elastically deformable member.

* * * * *